United States Patent [19]
Lindeman et al.

[11] Patent Number: 5,926,119
[45] Date of Patent: Jul. 20, 1999

[54] NUMERIC KEYPAD CONFIGURATION

[75] Inventors: Phillip E. Lindeman, Gurnee; Rudy Krolopp, Lake Zurich, both of Ill.

[73] Assignee: Motorola, Inc., Schaumburg, Ill.

[21] Appl. No.: 08/771,721

[22] Filed: Dec. 20, 1996

[51] Int. Cl.⁶ .................................................. H03K 17/94
[52] U.S. Cl. ........................ 341/22; 379/368; 364/709.12
[58] Field of Search ......................... 341/20, 22; 200/5 A;
235/145 R; 400/486, 488, 489; 364/709.12;
345/157; 379/368

[56] References Cited

U.S. PATENT DOCUMENTS

| | | | |
|---|---|---|---|
| 4,974,183 | 11/1990 | Miller | 364/709.17 |
| 5,274,217 | 12/1993 | Kilian | 235/145 R |
| 5,583,497 | 12/1996 | Hankes | 341/22 |
| 5,598,469 | 1/1997 | Preker | 379/368 |
| 5,610,602 | 3/1997 | Hargreaves | 341/22 |

*Primary Examiner*—Michael Horabik
*Assistant Examiner*—Albert K. Wong
*Attorney, Agent, or Firm*—Sylvia Chen

[57] ABSTRACT

A numeric keypad configuration facilitates accurate key-presses by varying key heights to provide obvious tactile feedback to a user. A home key (160) in a keypad (100) has a lower height (265) than the other keys in the matrix. After locating the home key using touch, surrounding keys can be quickly and accurately located also without looking at the keypad. Additionally, instead of printing a number or letter on the surface of a small key, alphanumeric labels (120) are provided in the spacing area between the keys on the telephone front housing (180) and illuminated, thus improving visibility of the numbers and letters in dim lighting situations. This numeric keypad configuration can be used on cellular telephone keypads or any electronic device where a small numeric keypad is desirable.

15 Claims, 1 Drawing Sheet

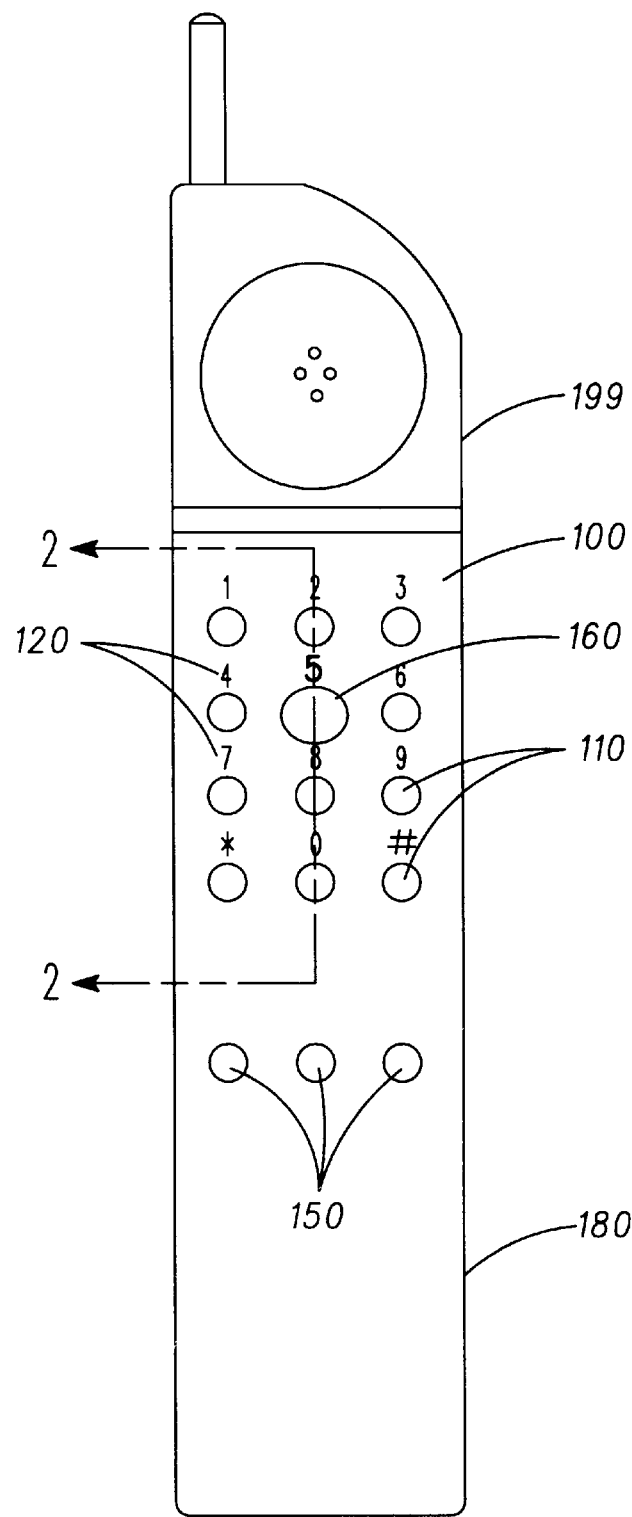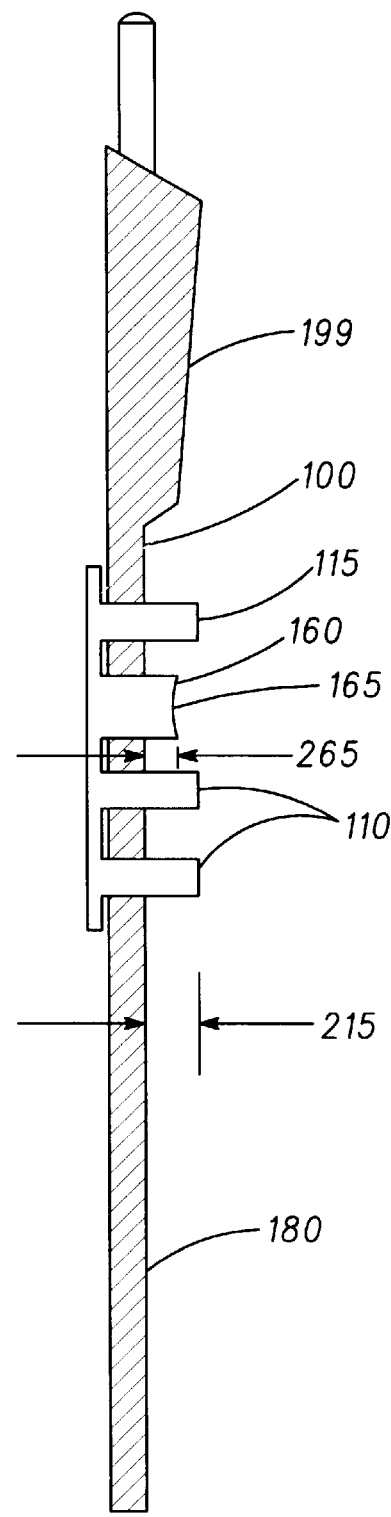
*FIG.1*  *FIG.2*

NUMERIC KEYPAD CONFIGURATION

CROSS REFERENCE TO RELATED APPLICATIONS

This application is related to U.S. patent application Ser. No. 08/625,382, filed Apr. 1, 1996 by inventors Krolopp et al. The related application is assigned to the assignee of the present application, and it is hereby incorporated herein in its entirety by this reference thereto.

FIELD OF THE INVENTION

This invention relates generally to electronic devices, and more particularly to a numeric keypad configuration for a portable electronic device.

BACKGROUND OF THE INVENTION

Various numeric keypads, such as those found on cash registers and extended computer keyboards, often have keys with bumps or other protrusions on their top surfaces to indicate the presence of a home key. These slight protrusions are helpful for touch typists, who are able to type without looking at the keyboard, because the bumps provide subtle tactile feedback to the typists to indicate that their hands are positioned properly on the keyboard.

For smaller and lighter portable electronic devices, numeric keypads are shrinking and consequently have smaller and smaller numbers and letters printed on top. Sometimes, a user cannot easily read the letters and numbers on a numeric keypad, especially in dim light or when they are involved in an activity such as driving. Because of this, users of these electronic devices sometimes experience difficulty in correctly pressing the keys of the numeric keypad. This drawback exists for users of cellular telephones and other portable electronic devices with numeric keypads. Thus, there exists a need for a numerical keypad configuration that promotes quick and accurate depression of a proper key even when the user cannot see the keys or is not looking at the keys.

BRIEF DESCRIPTION OF THE DRAWINGS

FIG. 1 shows a front view of a numeric keypad according to a preferred embodiment.

FIG. 2 shows a cross-sectional view of the keypad taken along line 2—2 in FIG. 1.

DETAILED DESCRIPTION OF THE PREFERRED EMBODIMENT

A numeric keypad configuration facilitates accurate keypresses by varying key heights to provide obvious tactile feedback to a user. A central or home key in a matrix of keys has a lower height than the other keys in the matrix. After locating the home key using touch, surrounding keys can be quickly and accurately located also without looking at the keypad. Additionally, instead of printing a number or letter on the surface of a small key, an alphanumeric label is provided in the spacing area between the keys on the telephone housing and illuminated, thus improving visibility of the numbers and letters in dim lighting situations. This numeric keypad configuration can be used on cellular telephone keypads or any electronic device where a small numeric keypad is desirable.

FIG. 1 shows a front view of a numeric keypad of an electronic device according to a preferred embodiment. The electronic device 199 pictured is a portable radiotelephone, however, other electronic devices with numeric keypads, such as computers, electronic typewriters, electronic cash registers, and facsimile machines, can include the numeric keypad. This keypad 100 is designed primarily for one-handed operation where a single finger is used to press all the keys in a sequence. In the portable radiotelephone implementation shown, the keypad is easiest to operate when four fingers and the palm of one hand are cradling the portable radiotelephone and the thumb is used to dial a telephone number.

Keypad 100 includes one or more keys 110 arranged in a matrix and one or more alphanumeric labels 120 in a front housing 180 preferably constructed of molded plastic. A central or home key 160, such as a "5" key, has a recessed height compared to the height of the other keys. Or, in other words, the non-home keys have an enhanced key height compared to the home key. The height difference between the home key 160 and the non-home keys should be obvious to users, so that even when they do not look at the keypad, users can locate the home key using a large and relatively insensitive finger such as a thumb. A height difference as small as one millimeter can be felt by a user. If that one millimeter height difference represents over ten percent of the non-home key height, the height difference between the non-home key and the home key should be obvious to users.

In order to further facilitate location using only the sense of touch, the home key 160 preferably has a slightly different shape compared to the other keys. For example, the home key 160 shown has a slightly larger surface than the other keys. Also, the home key 160 preferably has a surface that contrasts with the surface of the other keys. A concave home key surface that is differentiated from flat or convex non-home key surfaces encourages a finger to brush across the keypad surface to locate other keys yet return confidently to the home key. This obvious tactile feedback is especially useful in dialing situations when users cannot see the keypad clearly, such as while driving, in dim light situations at restaurants, and when users are vision impaired.

Alphanumeric labels 120 are provided directly on the front housing 180 in the area above each key and preferably illuminated using backlighting to enhance readability even in dim light situations. In a different location, light-emitting diodes 150 of various colors provide visual feedback information to a user regarding features such as battery power, radio signal strength, or menu function currently in use.

FIG. 2 shows a cross sectional view of the numeric keypad 100 taken along line 2—2 shown in FIG. 1. The keys 110 protrude from the front housing 180 of the keypad 100. The height 215 of a non-home key is approximately 4.75 millimeters, which allows for quick registry of a keypress by the electronic device and accurate tactile sensing of the non-home key by a user's finger. Although the surface 115 of the non-home keys is shown as flat, it may alternatively be concave or another configuration to contrast with the surface of the home key. The maximum height 265 of the home key is approximately 3.75 millimeters, which is one millimeter or twenty-one percent shorter than the non-home keys. Because the surface 165 of the home key 160 in this example is concave, the height of the home key varies from approximately 2.75 millimeters at the nadir to approximately 3.75 millimeters at the edges. A finger can detect less than a one millimeter difference in key height, however, to make the height difference obvious to users, a minimum ten percentage height difference is recommended as long as that percentage difference involves a height difference of at least one millimeter.

Thus, the numeric keypad configuration facilitates location of a home key even in situations when a user does not look at the keypad. Once a home key is located, the height of the home key provides tactile information to the user regarding the proximity of the surrounding non-home keys which have a different height. This encourages quick and accurate keypresses. While specific components and features of the numeric keypad configuration are described above, modified components or features could be employed by one skilled in the art within the true spirit and scope of the present invention. The invention should be limited only by the appended claims.

We claim:

1. A keypad having multiple keys arranged in a matrix having at least three rows and at least three columns, comprising:

a home key having a numeric label and a home key height;

a first additional key, adjacent to the home key, having a first non-home key height greater than the home key height;

a second additional key, adjacent to the home key, having the first non-home key height;

wherein the home key is between the first additional key and the second additional key;

wherein the home key, the first additional key, and the second additional key are arranged along a column of the matrix;

a third additional key, adjacent to the home key, having a second non-home key height greater than the home key height;

a fourth additional key, adjacent to the home key, having the second non-home key height;

wherein the home key is between the third additional key and the fourth additional key;

wherein the home key, the third additional key, and the fourth additional key are arranged along a row of the matrix.

2. A keypad according to claim 1 wherein a surface of the home key is concave.

3. A keypad according to claim 1 wherein a surface of the first additional key is planar.

4. A keypad according to claim 3 wherein a surface of the second additional key is planar.

5. A keypad according to claim 1 wherein a surface of the first additional key is convex.

6. A keypad according to claim 5 wherein a surface of the second additional key is convex.

7. A keypad according to claim 1 wherein the numeric label is "5."

8. A keypad according to claim 1 wherein the first non-home key height is equal to the second non-home key height.

9. A keypad having multiple keys arranged in a matrix having at least two rows and two columns, comprising:

a housing;

an outwardly-projecting home key, situated in the housing in a second row and a second column of the matrix, having a home key height;

an outwardly-projecting first non-home key, situated in the housing in the second row and a first column of the matrix adjacent to the home key, having a non-home key height different from the home key height;

an outwardly-projecting second non-home key, situated in the housing in a first row and the second column of the matrix adjacent to the home key, having the non-home key height; and an alphanumeric label, situated on the housing adjacent to the home key.

10. A keypad according to claim 9 wherein the home key height is less than the non-home key height.

11. A keypad according to claim 9 wherein the alphanumeric label is illuminated.

12. A keypad according to claim 9 further comprising:

an outwardly-projecting second non-home key, situated in the housing adjacent to the home key, having the non-home key height, wherein the home key, the first non-home key, and the second non-home key are arranged along a line.

13. A keypad according to claim 9 further comprising:

a light-emitting diode situated in the housing.

14. A keypad according to claim 9 wherein the alphanumeric label is "5."

15. A radiotelephone having a keypad with multiple keys arranged in a matrix having at least three rows and three columns, comprising:

a housing;

a home key, situated in the housing, having a home key height;

an alphanumeric label, situated on the housing adjacent to the home key;

a first additional key, situated in the housing adjacent to the home key, having a non-home key height that is greater than the home key height;

a second additional key, situated in the housing adjacent to the home key, having the non-home key height;

wherein the home key is between the first additional key and the second additional key;

wherein the home key, the first additional key, and the second additional key are arranged along a column of the matrix;

a third additional key, situated in the housing adjacent to the home key, having the non-home key height;

a fourth additional key, situated in the housing adjacent to the home key, having the non-home key height;

wherein the home key is between the third additional key and the fourth additional key; and wherein the home key, the third additional key, and the fourth additional key are arranged along a row of the matrix.

* * * * *

UNITED STATES PATENT AND TRADEMARK OFFICE
CERTIFICATE OF CORRECTION

PATENT NO. : 5,926,119
DATED : August 9, 1999
INVENTOR(S) : Lindeman

It is certified that error appears in the above-identified patent and that said Letters Patent is hereby corrected as shown below:

Claim 12

In column 4, line 17, please replace "second" with -- third--.

Claim 12

In column 4, line 21, please replace "second" with -- third--.

Signed and Sealed this

Fourth Day of January, 2000

Attest:

Attesting Officer

Acting Commissioner of Patents and Trademarks